(12) United States Patent
Kassar et al.

(10) Patent No.: US 12,168,438 B2
(45) Date of Patent: Dec. 17, 2024

(54) SYSTEMS AND METHODS FOR CONTROLLING SPEED OF AN AUTONOMOUS VEHICLE

(71) Applicant: FORD GLOBAL TECHNOLOGIES, LLC, Dearborn, MI (US)

(72) Inventors: Alice Kassar, Detroit, MI (US); Scott Julian Varnhagen, Ann Arbor, MI (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 17/498,358

(22) Filed: Oct. 11, 2021

(65) Prior Publication Data
US 2023/0115758 A1    Apr. 13, 2023

(51) Int. Cl.
| | |
|---|---|
| *B60W 30/14* | (2006.01) |
| *B60W 40/105* | (2012.01) |
| *B60W 50/00* | (2006.01) |
| *B60W 60/00* | (2020.01) |
| *G06N 20/00* | (2019.01) |

(52) U.S. Cl.
CPC ........ *B60W 30/143* (2013.01); *B60W 40/105* (2013.01); *B60W 50/00* (2013.01); *B60W 60/001* (2020.02); *G06N 20/00* (2019.01); *B60W 2050/0054* (2013.01); *B60W 2520/10* (2013.01)

(58) Field of Classification Search
None
See application file for complete search history.

(56) References Cited

U.S. PATENT DOCUMENTS

| | | | |
|---|---|---|---|
| 8,170,739 B2 * | 5/2012 | Lee .................. | G01C 21/12 |
| | | | 701/28 |
| 10,002,299 B2 * | 6/2018 | Ono ................ | G06V 20/588 |
| 10,073,458 B2 * | 9/2018 | Kim ................ | G01C 21/3446 |
| 10,102,247 B2 | 10/2018 | Duan et al. | |

(Continued)

OTHER PUBLICATIONS

Zhang, Y. et al., Toward a More Complete, Flexiblem and Safer Speed Planning for Autonomous Driving via Convex Optimization, Sensors, vol. 18, No. 7, 2185, Jul. 2018.

(Continued)

*Primary Examiner* — Jonathan M Dager
(74) *Attorney, Agent, or Firm* — Frank A. MacKenzie; Brooks Kushman P.C.

(57) ABSTRACT

Systems and methods for generating a trajectory of a vehicle are disclosed. The methods include generating a spatial domain speed profile for a path represented as a sequence of poses of a vehicle between a first point and a second point. Generation of the spatial domain speed profile uses a longitudinal problem while excluding a derate interval on the path when speed of the vehicle cannot exceed a threshold. The methods further include generating a derate profile using the spatial domain speed profile and the derate interval, and transforming the derate interval to a temporal derate interval. The temporal derate interval may include time steps at which the speed of the vehicle cannot exceed the threshold while traversing the path, and may be used as an input to the longitudinal problem for generating a trajectory of the vehicle for navigating between the first point and the second point.

17 Claims, 8 Drawing Sheets

(56) References Cited

U.S. PATENT DOCUMENTS

| | | | | |
|---|---|---|---|---|
| 10,429,849 | B2* | 10/2019 | Zhang | B60W 60/001 |
| 10,640,111 | B1* | 5/2020 | Gutmann | B60W 30/143 |
| 10,725,470 | B2* | 7/2020 | Mahabadi | B60W 30/00 |
| 10,732,632 | B2* | 8/2020 | Li | B60W 60/001 |
| 10,809,736 | B2* | 10/2020 | Xu | G06N 3/08 |
| 2015/0353082 | A1* | 12/2015 | Lee | B60W 10/20 |
| | | | | 701/41 |
| 2017/0330461 | A1* | 11/2017 | Caveney | G08G 1/161 |
| 2018/0164822 | A1* | 6/2018 | Chu | G05D 1/0217 |
| 2018/0170382 | A1* | 6/2018 | Soliman | B60L 15/2045 |
| 2019/0086930 | A1* | 3/2019 | Fan | G05D 1/0088 |
| 2019/0243370 | A1* | 8/2019 | Li | B60W 30/095 |
| 2019/0317509 | A1* | 10/2019 | Zhang | G05D 1/0088 |
| 2020/0310446 | A1* | 10/2020 | Zhu | B60W 60/0015 |
| 2020/0310451 | A1* | 10/2020 | Zhu | G05D 1/0223 |
| 2020/0379474 | A1* | 12/2020 | Zhang | B60W 30/146 |
| 2021/0026358 | A1* | 1/2021 | Sheu | G05D 1/0274 |
| 2021/0200231 | A1* | 7/2021 | Zhu | B60W 30/181 |
| 2021/0271245 | A1* | 9/2021 | Bradley | G05D 1/227 |
| 2021/0318683 | A1* | 10/2021 | Luo | G01C 21/3407 |
| 2021/0347381 | A1* | 11/2021 | Zhu | B60W 10/04 |
| 2021/0383133 | A1* | 12/2021 | Wang | G01S 15/931 |
| 2021/0394791 | A1* | 12/2021 | Zhu | B60W 30/10 |
| 2022/0026910 | A1* | 1/2022 | Liu | B60W 60/00276 |
| 2022/0204056 | A1* | 6/2022 | Russell | B60W 60/00272 |
| 2022/0379928 | A1* | 12/2022 | Varnhagen | B60W 60/0011 |
| 2023/0005370 | A1* | 1/2023 | Schroeder | B60W 30/0953 |
| 2023/0053243 | A1* | 2/2023 | Lin | B60W 30/0956 |
| 2023/0100961 | A1* | 3/2023 | Pan | G01C 21/3691 |
| | | | | 701/24 |

OTHER PUBLICATIONS

Gu, T. et al., Focused Trajectory Planning for Autonomous On-Road Driving, 2013.

Ding, W. et al., Safe Trajectory Generation for Complex Urban Environments Using Spatio-temporal Semantic Corridor, IEEE, 2019.

Liu, C. et al., Speed Profile Planning in Dynamic Environments via Temporal Optimization.

Xu, W. et al., A Real-Time Motion Planner with Trajectory Optimization for Autonomous Vechicles, Proceedings—IEEE International Conference on Robotics and Automation—May 2012.

Serna, C. et al., Dynamic Speed Adaptation for Path Tracking Based on Curvature Information and Speed Limits, Sensors, vol. 17, No. 6, 1383, Jun. 2017.

Extended European Search Report of European application No. 22199808.1 dated Mar. 6, 2023, 7 pages.

* cited by examiner

SYSTEMS AND METHODS FOR CONTROLLING SPEED OF AN AUTONOMOUS VEHICLE

BACKGROUND

An autonomous vehicle typically has to handle complex traffic scenarios by taking into consideration dynamic actors and stationary objects. A trajectory comprising time and space information defines the desired movement of an autonomous vehicle through an environment. Motion planning is responsible for finding such a trajectory that is feasible for the autonomous vehicle, comfortable for the passengers, and avoids collisions with other traffic participants.

Motion planning may be executed in two distinct steps. A path that the autonomous vehicle will follow is determined in a first step, taking into account road geometry and perception information. A second step determines when the vehicle will pass a point on the path in the form of a speed profile for following the determined path. This is defined by a time stamp connected with each point on the path, and hence the speed that the vehicle needs to drive to reach that point, such that the temporal component is responsible for avoiding collisions with dynamic actors. Speed planning plays an important role in guaranteeing, for example, the ride comfort in autonomous driving applications. Different kinds of scenarios together raise distinct requirements and consequently different constraint types for speed planning problem formulations, which makes it challenging to solve.

For example, various information related to the path determined in the first step is often used as an input to the second step. Examples of such information include intervals on the determined path when the autonomous vehicle needs to decelerate, accelerate, or the like. However, such information relating to the path is in the spatial domain and must be transformed to the temporal domain before being input into the second step. The transformation is done using an approximate speed profile generated before executing the second step. However, inaccuracies in the approximate speed profile (e.g., over estimation or underestimation) can lead to an inaccurate transformation of the spatial information in the temporal domain leading to inaccuracies in the output of the second step.

This document describes methods and systems that are directed to addressing the problems described above, and/or other issues.

SUMMARY

The present disclosure concerns implementing systems and methods for for controlling navigation of an autonomous vehicle. The methods may include, by a computing device: generating a spatial domain speed profile for a path that is represented as a sequence of poses of a vehicle between a first point and a second point. Generating the spatial domain speed profile may be performed using a longitudinal problem while excluding a derate interval that corresponds to a portion of the path within which a speed of the vehicle cannot exceed a threshold. The methods may also include generating a derate profile for the path using the spatial domain speed profile and the derate interval, and transforming the derate interval to a temporal derate interval using the derate profile. The temporal derate interval may include time steps at which the speed of the vehicle cannot exceed the threshold while traversing the path, and may be used as an input to the longitudinal problem for generating a speed profile for the path. The speed profile and the path may be used for generating a trajectory of the vehicle for navigating between the first point and the second point.

In some scenarios, generating the spatial domain speed profile may include using the longitudinal problem while excluding the derate interval for generating a temporal speed profile, and generating the spatial domain speed profile by transforming the temporal speed profile to a spatial domain.

In some other scenarios, generating the derate profile for the path may include combining the derate interval with the spatial domain speed profile and determining a minimum speed at each point along the path. Additionally and/or alternatively, generating the derate profile for the path may include combining the derate interval with the spatial domain speed profile and determining a speed as a weighted average at each point along the path.

In various implementations, the methods may also include determining the derate interval based on, for example, occlusions along the path, map information corresponding to the path, and/or perception information corresponding to the path. Optionally, the derate interval may be determined in a spatial domain relative to the path.

In certain scenarios, the derate interval may also include an identification of the portion of the path and the threshold based on a rule set or a machine learning model.

The implementing systems can comprise: a processor; and a non-transitory computer-readable storage medium comprising programming instructions that are configured to cause the processor to implement a method for operating an automated system. Additionally and/or alternatively, the non-transitory computer-readable storage medium and the programming instructions may be included in a computer program product.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

As discussed above, motion planning for an autonomous vehicle may be performed in two consecutive steps: (1) determination of a path that the autonomous vehicle needs to follow, and (2) speed planning for determination of a speed profile for the path. A path consists of positions combined with orientation of the autonomous vehicle ("pose"), between a start pose and an end pose. Speed planning connects the space component of a path with time. As a result, a speed profile is generated which maps time stamps to space for a given path (i.e., a speed profile is a one-to-one mapping between the temporal domain and the distance domain of the path). In other words, the speed profile determines when the autonomous vehicle should reach a point on the path while avoiding collision with objects and optimizing driving quality. Combining space and time creates a trajectory with positions, orientations, and time stamps. To generate a desired speed profile, the vehicle needs to consider driving quality (such as time-efficiency, speed limit, longitudinal and lateral comfort), feasibility (such as longitudinal and lateral acceleration limits) and risk reduction. The speed profile may be generated by formulating and solving a longitudinal optimization problem ("longitudinal problem") in the temporal domain that attempts to achieve longitudinal objectives and satisfy longitudinal constraints. Such an optimization problem may be solved using a Quadratic Programming problem, a linear problem, a dynamic programming problem, machine learning, or the like. As such, a solver (e.g., included in the vehicle controller) that formulates and solves the longitudinal problem may determine how to control positions, speeds and accelerations of the autonomous vehicle as a function of time.

The output of the first step (i.e., the path) is in the spatial domain, and information may be determined or described relative to the path in the spatial domain for input into the second step. For example, a longitudinal objective may be to cause the autonomous vehicle to slow down while traversing narrow corridors and/or while veering around actors or objects. This slowing down phenomena may be referred to as a derate, and is determined in the spatial domain as a distance interval on the path within which the autonomous vehicle should not exceed a threshold speed. Hence, the derate interval must be transformed into the temporal domain before being used as an input to the longitudinal problem during the second step. As discussed above, the transformation from the spatial to the temporal domain also requires a speed profile, and prior art systems and methods use an approximate speed profile for performing the transformation (e.g., an approximate speed profile determined assuming constant speed, assuming a maximum allowed lateral acceleration, previous cycle's speed profile, or the like). However, the approximate speed profile may include inaccuracies such as overestimations and/or underestimations of speed which may lead to inaccurate representation of the spatial derate profile in the temporal domain.

Figure 1A:
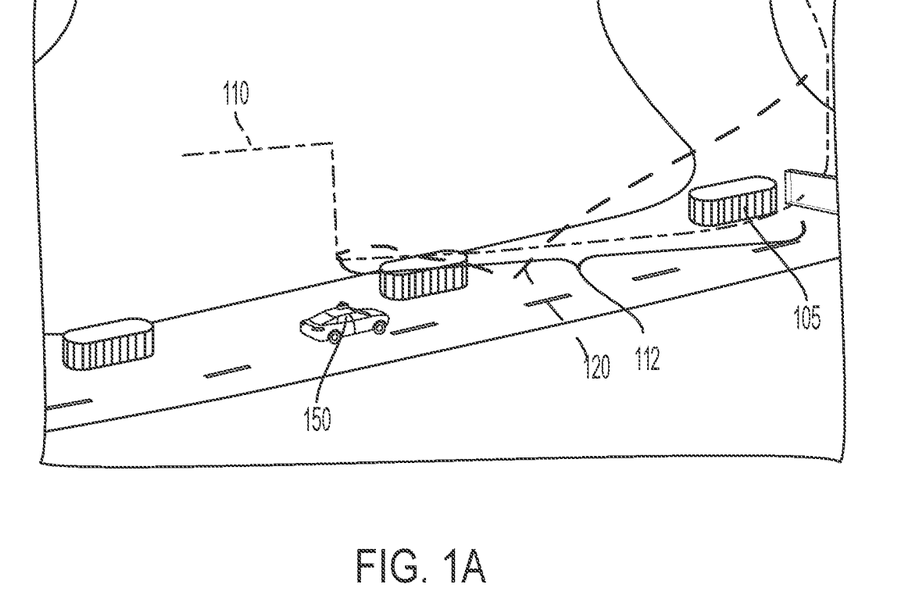
FIGS. 1A, 1B, and 1C illustrate the use of an approximate speed profile for identifying derate intervals.
Figure 1B:
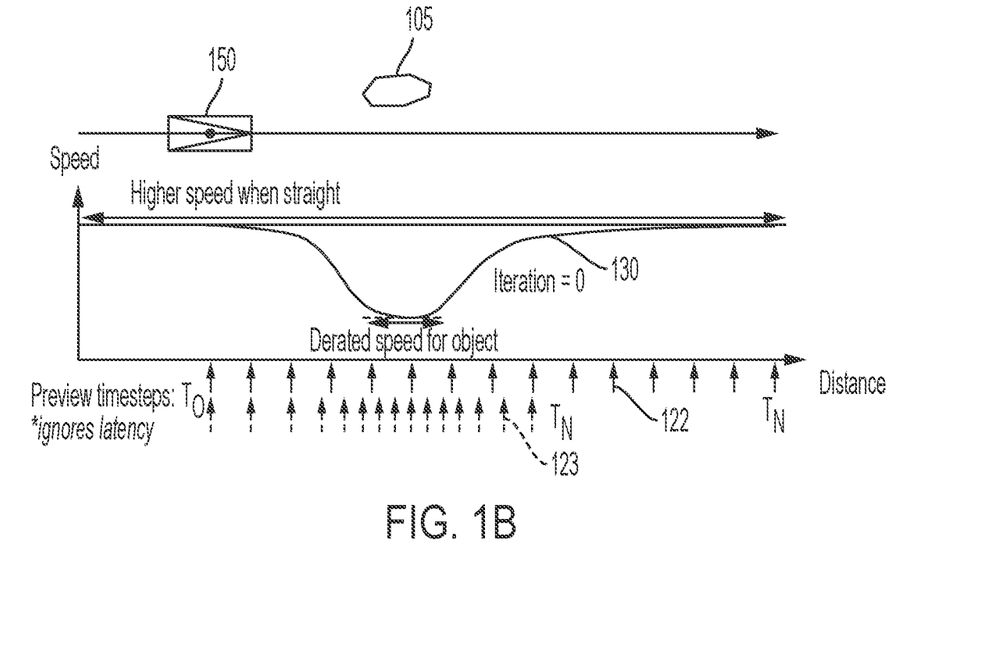

For example, overestimating the speed profile can make the derate interval appear early in the temporal domain and result in preemptive slowing down of the autonomous vehicle as shown in FIG. 1A. In FIG. 1A, line 110 represents the required derate interval 112 in the distance domain for the autonomous vehicle 150 while approaching the actor 105, and line 120 represents the speed profile generated using the derate interval 112 as an input to the longitudinal problem solver that is converted to the temporal domain using an approximate speed profile. As illustrated from line 120, the autonomous vehicle 150 starts slowing down before the actual derate interval 112 (i.e., before approaching the object 105) using the generated speed profile. This may be explained using the corresponding speed distance graph (i.e., speed profile) shown in FIG. 1B. Specifically, if a constant velocity assumption is used for generating the approximate speed profile 130, the estimated time when the autonomous vehicle 150 will hit the derate position (arrows 122) for passing the object 105 will be much smaller than the actual time the derate interval will be hit (arrow 123), which will make the autonomous vehicle 150 slow down preemptively. Specifically, the vehicle requires a speed objective represented in the spatial domain, and has to determine when these objectives need to be satisfied in the temporal domain. To do this mapping, when an approximate speed profile is used, inaccuracies lead to inaccurate representation of the spatial derate profile in the temporal domain. For example, if a constant speed of 10.0 m/s is assumed, and the vehicle needs to slow down to 0.0 m/s after traveling for 20.0 m on the path. In this example, the system may determine based on the constant speed profile that the vehicle needs to be at 0.0 m/s in 2.0 seconds. Assuming, constant deceleration for passenger comfort, the vehicle will come to a stop in 10.0 m instead of the desired 20.0 m based on the following constant acceleration equation:

$$\text{delta\_distance\_}m = \tfrac{1}{2} * (\text{delta\_velocity\_}mps) * \text{time\_}s = \tfrac{1}{2} * 10.0 * 2.0 = 10.0 m$$

Figure 1C:
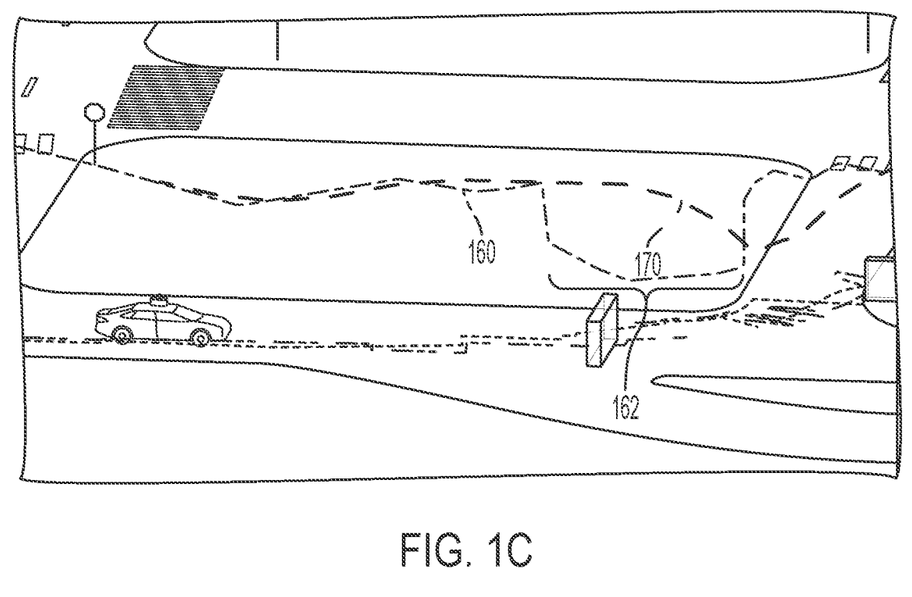

On the other hand, underestimating the speed profile can make the derate interval really far out in the future which will make the autonomous vehicle slow down after the derate interval as shown in FIG. 1C. In FIG. 1C, line 160 represents the derate interval 162 in the distance domain, and line 170 shows the speed profile generated based on the derate interval 162 that is converted to the temporal domain using an approximate speed profile. As shown in FIG. 1C, the deceleration phase in the generated speed profile 170 falls behind the desired derate interval 162.

This document describes methods and systems for improved transformation of spatial information relative to the path generated in the first step for input into the second speed profile generation step during motion planning. As described in more detail below, the systems and methods of this disclosure allow the longitudinal problem solver to accurately consider spatial speed targets (e.g., the derate interval) as inputs in the second step of motion planning that is executed in the temporal domain using a speed profile that does not include and/or reduces under estimations and/or over estimations. The proposed systems and methods may allow the longitudinal problem solver to control the autonomous vehicle for, for example, following a leading vehicle with a predetermined margin (a temporal objective since leading vehicle is moving in time), ensuring that the autonomous vehicle is travelling below a threshold speed limit between a first point and a second point along the determined path (a spatial objective) such as during overtake maneuvers, turn executions, traffic lights, proximity to an object, occlusions, ramps, or the like. While the current disclosure describes the generation of a speed profile, it is not so limiting. Similar principles may be used for generating vehicle acceleration profiles, derate intervals, minimum speed, maximum speed, minimum acceleration, maximum acceleration, minimum acceleration jerk, maximum acceleration jerk, or the like.

Figure 2:
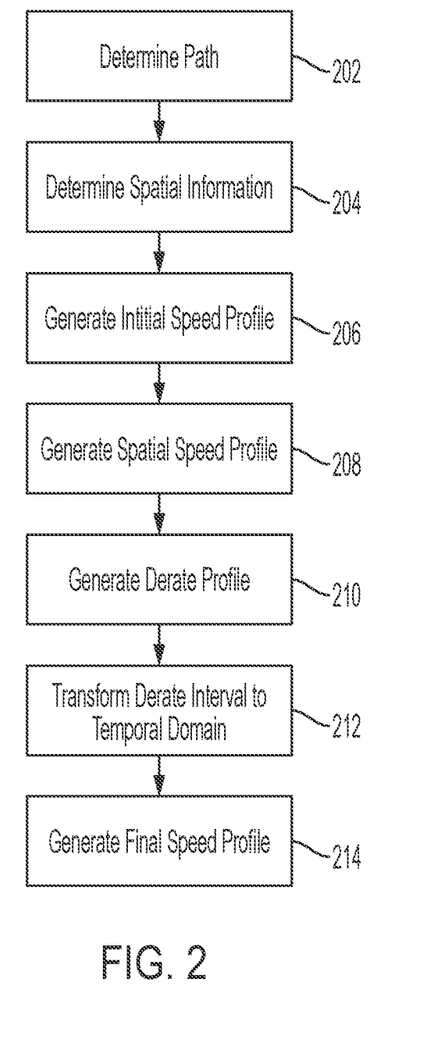
FIG. 2 illustrates an example method for generating a speed profile.

FIG. 2 illustrates a method of transforming spatial information relative to a path in the temporal domain for generation of a speed profile of an autonomous vehicle, according to an embodiment. As illustrated by FIG. 2, a system may first identify a path between an initial pose and a final pose of the autonomous vehicle (202) as a continuous sequence of poses or configurations. A path is a geometric trace that the vehicle should follow in order to reach its destination without colliding with obstacles. Path-planning is, therefore, a problem of finding a geometric path from an initial pose to a given terminating pose such that each pose on the path is a feasible one. A feasible pose does not result in a collision and adheres to a set of motion constraints such as vehicle kinematic constraints, road and lane boundaries, as well as traffic rules. In various implementations, the path may be generated using any now or hereafter known path generation methods such as by connecting sampled endpoints and/or current pose using different kinds of curvature polynomials (e.g., cubic, quadratic, etc.) based on, for example, map data, perception data, or the like.

Upon generation of the path, the system may determine (204) spatial information relative to the path such as, without limitation, derate intervals, minimum speed, maximum speed, minimum acceleration, maximum acceleration, minimum acceleration jerk, maximum acceleration jerk, or the like, for use as input during speed planning. The following disclosure describes the generation of a speed profile for determining a derate interval for example purposes only, and should not be considered limiting.

A derate interval may include a starting and an end point on the path, and a maximum allowed velocity between the starting and the end point. The derate interval may also include a deceleration ramp. In other words, a derate interval may be used as a constraint on velocity during speed planning. The system may determine the derate intervals on the path based on, for example, perception information in the vicinity of the path/autonomous vehicle (e.g., information about one or more objects/actors detected), map information (e.g., upcoming turns, ramps, traffic signals, etc.), lack of sensor information (e.g., occluded regions), or the like. For example, the system may use a rule set that defines the starting and end points and maximum allowed velocity relating to various driving situations. Optionally, the system may use machine learning algorithms for determining the derate intervals relating to various driving situations.

At 206, the system may generate an initial speed profile for the path without taking into consideration the spatial information (e.g., derate intervals). The system may generate the initial speed profile by solving a longitudinal problem for a given set of positional and velocity constraints for the path, while excluding the derate interval constraints. The positional and velocity constraints may include, for example, positions of various stops along the path, positions and information relating to various objects, minimum and maximum speed limits, or the like. The longitudinal objectives may be determined using a trained machine learning model having learning parameters associated with various constraints (e.g., traffic scenarios, turn executions, stops, path geometries, objects, physical limits of the vehicle, or the like). It should be noted that the initial speed profile will describe the fastest possible speed profile for the path (and consequently the longest possible distance) that the longitudinal model will output because derates will either slow down the autonomous vehicle or not have any impacts on the speed profile.

A constraint may have a direction and a length, which may provide instructions to an autonomous vehicle as to when to begin changing direction and how much of an adjustment to its movement is needed. A constraint may be used to penalize undesired behavior and incentivize desired behavior.

The initial speed profile is in the temporal domain and may provide a distance, speed, and acceleration solution along the path as a function of time. The system may transform the initial speed profile into a spatial domain speed profile along the path (208) by, for example, plotting the distance included in the initial speed profile against the speed, interpolating between position points when the speed profile varies with time (assuming constant acceleration), or the like.

The system may then combine the derate interval(s) with the spatial domain speed profile—in the spatial domain—to generate a derate profile for the path (210). The system may combine the derate interval(s) with the spatial domain speed profile by, for example, combining the derate interval(s) and the spatial domain speed profile by selecting the minimum speed at every point along the path (e.g., when adhering to the maximum allowed speed during the derate interval is important). Additionally and/or alternatively, the system may combine the derate interval(s) with the spatial domain speed profile by taking a weighted average of the respective speeds of the derate interval(s) and the spatial domain speed profile. In such embodiments, the weights may be selected based on the relative importance of the derate interval(s) and the spatial domain speed profile. For example, a low relative weight may be assigned to the derate interval if derate speed is to be achieved only when comfortable and/or feasible, or the like. Optionally, the system may propose a likely maximum spatial speed profile (i.e. the maximum expected speed at each spatial position) based on, for example, current speed of the vehicle, certainly with respect to the perceived information about the environment, etc. This may be done, for example, using hard constraints (e.g., maximum allowed lateral acceleration during a corner, while passing an object, etc.), weighted heuristics (e.g., moderate emphasis on slowing while passing a parked vehicle), or the like.

Figure 3A:
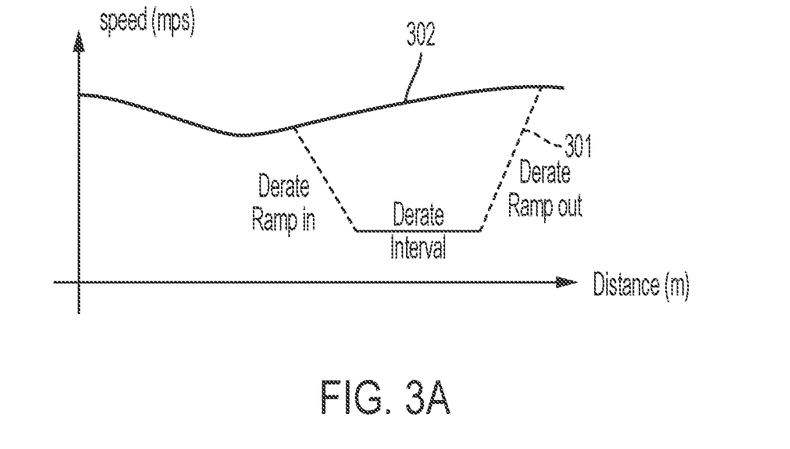
FIGS. 3A and 3B illustrate example spatial domain speed profiles and derate intervals generated using the methods of this disclosure.

For example, as shown in FIG. 3A, a derate profile (not shown here) may be generated by combination of the derate interval 301 with the spatial domain speed profile 302 by selecting the minimum speed at every point along the path. FIG. 3C illustrates a derate profile 320 for the path generated by combination of the derate intervals 304 and 303 with the spatial domain speed profile 305 (shown in FIG. 3B) by selecting the minimum speed at every point along the path.

The derate profile is an estimate for the speed of the autonomous vehicle with respect to distance, and may be used instead of potentially inaccurate speed profile approximations for transformation of the derate intervals to the temporal domain. Using the derate profile may ensure that the transformation is reasonably accurate. Therefore, at 212, the system may transform the derate profile (from step 204) to the temporal domain, and use the temporal domain derate profile to determine a temporal derate interval in the temporal domain. The system may do so by, for example, transforming information from the spatial domain to the temporal domain using integration on equations for segments such as:

$$acceleration\_segment = ((final\_speed * final\_speed) - (initial\_speed * initial\_speed))/(2.0 * segment\_length)$$

$$time\_along\_segment = (final\_speed - initial\_speed)/acceleration\_segment$$

Figure 3B:
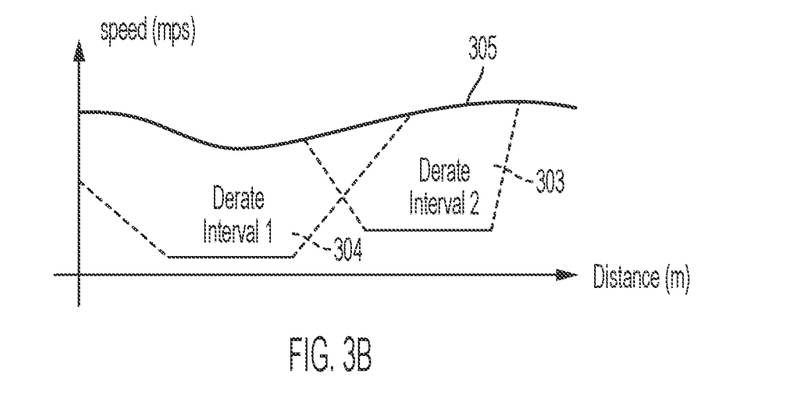
Figure 3C:
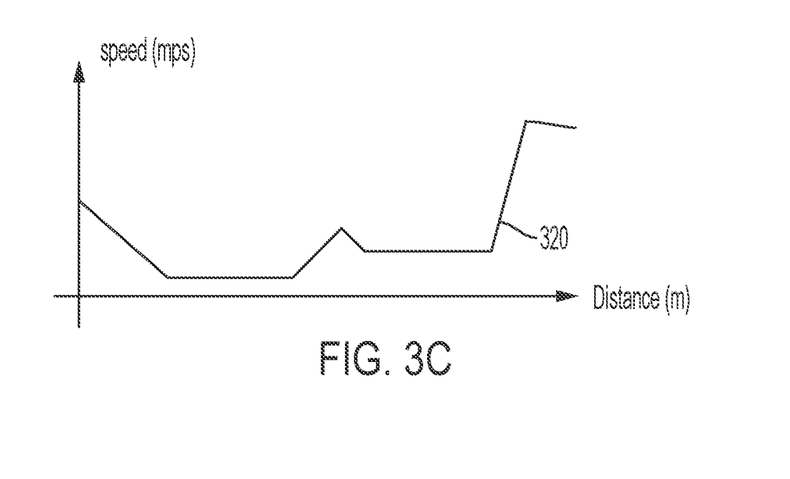
FIG. 3C illustrates an example derate profile generated from the spatial domain speed profile of FIG. 3B, using the methods of this disclosure.

For example, the system may transform the derate profile 320 of FIG. 3B to the temporal domain, and determine a temporal derate interval in the temporal domain from the transformed derate profile. A temporal derate interval is a constraint (or objective) on the required speed of the vehicle at various future times. Optionally, in some examples the temporal derate interval may identify time steps at which the autonomous vehicle speed cannot exceed the threshold speed (e.g., when a high weight is assigned to the derate interval in step 210).

Figure 4A:
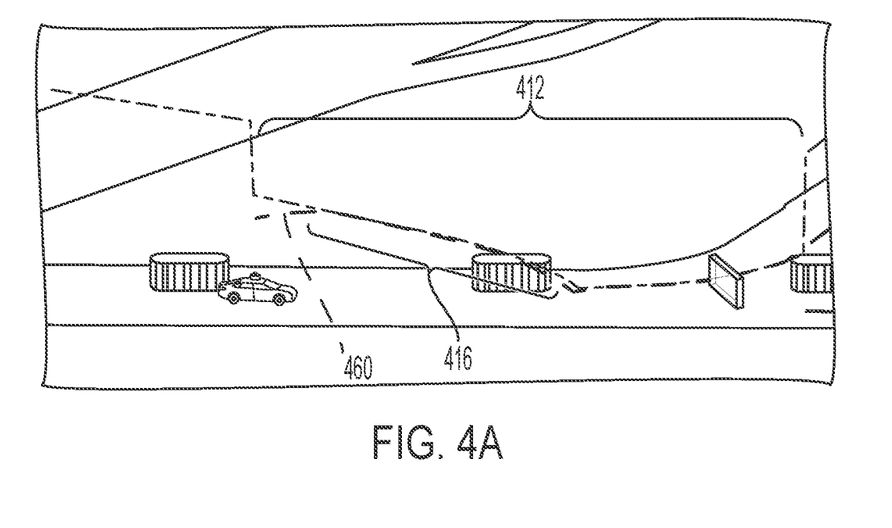
FIGS. 4A and 4B illustrate example derate profiles.
Figure 4B:
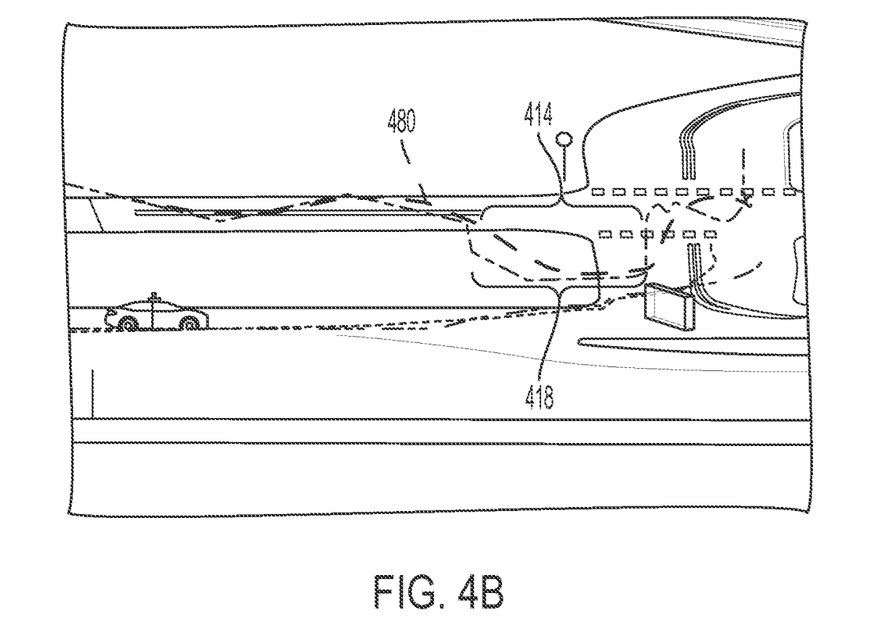

At 214, the system may use the temporal derate interval along with the other positional and velocity constraints (used in step 206) as an input to the longitudinal problem of step 206 to output a final speed profile for the path. As shown in FIGS. 4A and 4B, the derate intervals 412 and 414 closely correspond to the derates 416 and 418 in the generated speed profiles 460 and 480, respectively where the speed profiles 460 and 480 are generated using the systems and methods of this disclosure.

In various embodiments, the system may use the determined path and the final speed profile for determining a trajectory of the autonomous vehicle for navigating between two points. In various embodiments, an on-board computing device of an autonomous vehicle may determine a trajectory for the autonomous vehicle based on path and/or final speed profile.

Although the above disclosure describes generation of a speed profile by conversion of a derate interval to the temporal domain, it is understood that the system may perform transformation of spatial information to the temporal domain for generation of a speed profile in a manner similar to that described above.

Figure 5:
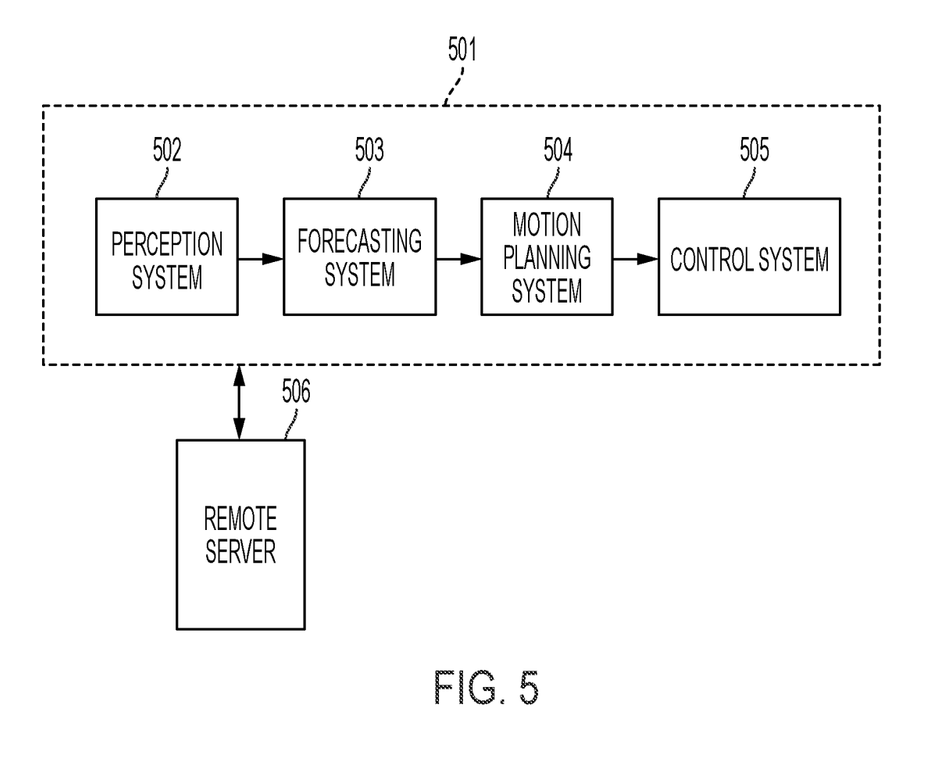
FIG. 5 is a block diagram illustrating a high level overview of certain autonomous vehicle subsystems.

FIG. 5 shows a high-level overview of vehicle subsystems that may be relevant to the discussion above. Specific components within such systems will be described in the discussion of FIG. 6 later in this document. Certain components of the subsystems may be embodied in processor hardware and computer-readable programming instructions that are part of the vehicle on-board computing system 501.

The subsystems may include a perception system 502 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

In some situations, sensors that collect perception data may include one or more environmental sensors such as a thermometer that is configured to detect temperature, a photoelectric device that is capable of measuring the intensity of ambient light around the vehicle, If the vehicle is an AV, the vehicle's perception system 502 may deliver perception data to the vehicle's forecasting system 503. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 504 and motion control system 505 so that the receiving systems may assess such data and initiate any number of reactive motions to such data. The motion planning system 504 and control system 505 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2015).

In non-AV embodiments, such as with vehicles that are driven by human operators, the motion planning system 504 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 502 may include a transceiver of an electronic device that receives certain perception data (such as weather data) from a remote server via wireless communication.

The vehicle's on-board computing system 501 will be in communication with a remote server 506. The remote server 506 is an external electronic device that is in communication with the vehicle's on-board computing system 501, either via a wireless connection while the vehicle is making a run, or via a wired or wireless connection while the vehicle is parked at a docking facility or service facility. The remote server 506 may receive data that the vehicle collected during its run, such as perception data and operational data. The remote server 506 also may transfer data or other information to the vehicle such as software updates, high definition (HD) map updates, machine learning model updates and other information.

Figure 6:
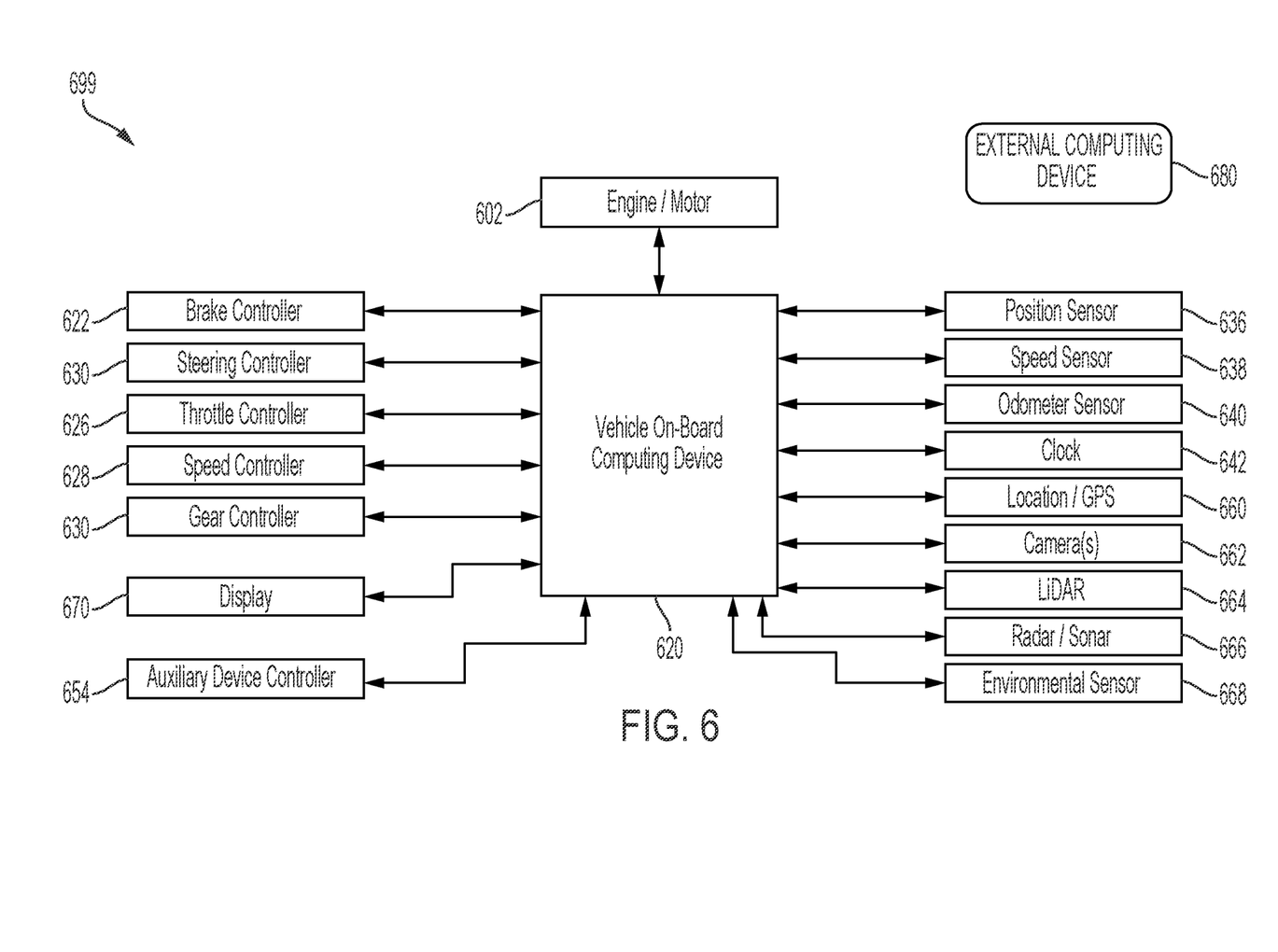
FIG. 6 illustrates an example vehicle controller system.

FIG. 6 illustrates an example system architecture 699 for a vehicle, such as an autonomous vehicle. The vehicle may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle also may have a clock 642 that the system architecture uses to determine vehicle time during operation. The clock 642 may be encoded into the vehicle on-board computing device 66. It may be a separate device, or multiple clocks may be available.

The vehicle also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as (a) a photosensor or other light sensor that can measure intensity of ambient light around the vehicle; (b) a rain sensor such as a sensor that projects infrared light into a windshield at an angle uses a measure of the amount of light that is reflected back to the sensor to measure an amount of precipitation that is on the windshield; and/or (c) an ambient temperature gauge or other type of temperature sensor. The object detection sensors may enable the vehicle to detect moving actors and stationary objects that are within a given distance range of the vehicle in any direction, while the environmental sensors collect data about environmental conditions within the vehicle's area of travel. The system architecture will also include one or more cameras 662 for capturing images of the environment. Any or all of these sensors will capture sensor data that will enable one or more processors of the vehicle's on-board computing device 620 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During operations, information is communicated from the sensors to an on-board computing device 620. The on-board computing device 620 analyzes the data captured by the sensors and optionally controls operations of the vehicle based on results of the analysis. For example, the on-board computing device 620 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654.

During a run of the vehicle, information is communicated from the sensors to an on-board computing device 620. The on-board computing device 620 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 620 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 660 to the on-board computing device 620, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors to the on-board computing device 620. The object detection information and/or captured images may be processed by the on-board computing device 620 to detect objects in proximity to the vehicle. In addition or alternatively, the vehicle may transmit any of the data to an external server 680 for processing. Any known or to be known technique for making an object detection based on sensor data and/or captured images can be used in the embodiments disclosed in this document.

Figure 7:
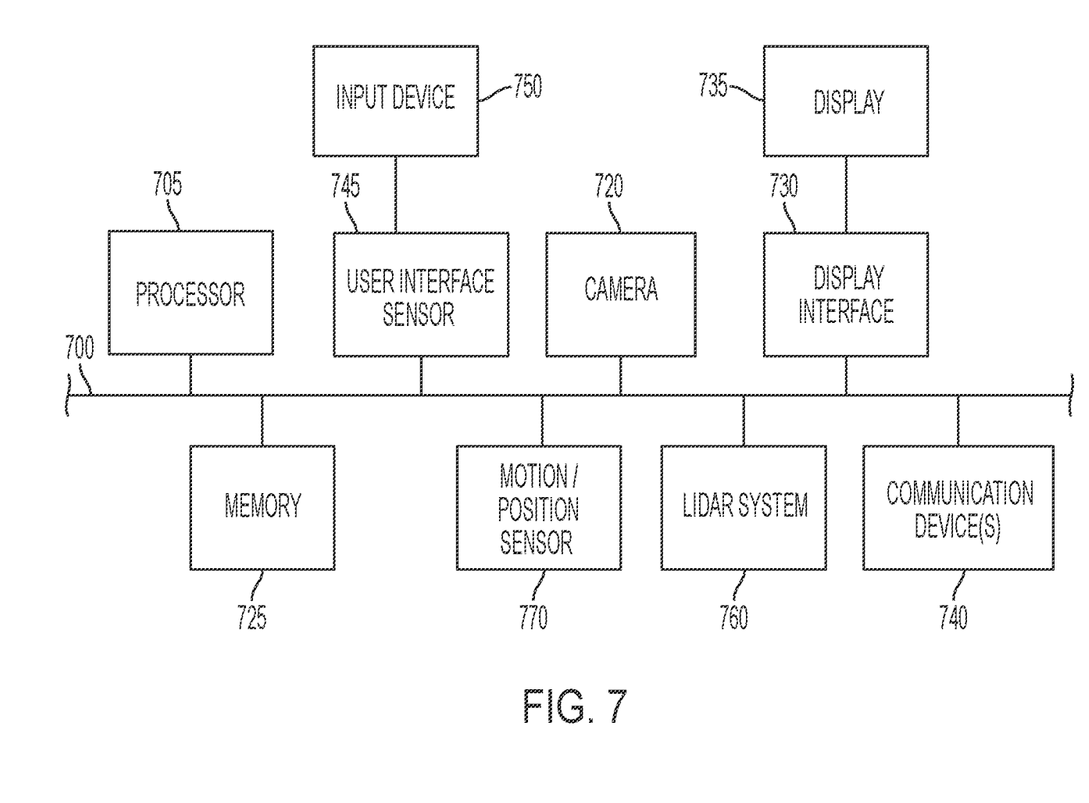
FIG. 7 is a block diagram that illustrates various elements of a possible electronic system, subsystem, controller and/or other component of an autonomous vehicle, and/or external electronic device.

In addition, the AV may include an onboard display device 750 that may generate and output an interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and/or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method, comprising:
by a computing device:
generating a spatial domain speed profile for a path that is represented as a sequence of poses of a vehicle between a first point and a second point, wherein the generating uses a longitudinal problem and excludes a derate interval that corresponds to a portion of the path within which a speed of the vehicle cannot exceed a threshold;
generating, using the spatial domain speed profile and the derate interval, a derate profile for the path, wherein generating the derate profile for the path includes combining the derate interval with the spatial domain speed profile and determining a speed as a weighted average at each point along the path;
transforming, using the derate profile, the derate interval to a temporal derate interval comprising time steps at which the speed of the vehicle cannot exceed the threshold while traversing the path;
generating, using the temporal derate interval as an input to the longitudinal problem, a speed profile for the path; and
generating, based on the speed profile and the path, a trajectory of the vehicle for navigating between the first point and the second point.

2. The method of claim 1, wherein generating the spatial domain speed profile comprises:
generating, using the longitudinal problem and excluding the derate interval, a temporal speed profile; and
generating the spatial domain speed profile by transforming the temporal speed profile to a spatial domain.

3. The method of claim 1, wherein generating the derate profile for the path comprises combining the derate interval with the spatial domain speed profile and determining a minimum speed at each point along the path.

4. The method of claim 1, further comprising determining the derate interval based on at least one of the following: occlusions along the path, map information corresponding to the path, or perception information corresponding to the path.

5. The method of claim 4, wherein the derate interval is determined in a spatial domain relative to the path.

6. The method of claim 1, wherein the derate interval comprises an identification of the portion of the path and the threshold based on a rule set or a machine learning model.

7. A system comprising:
a processor; and
a non-transitory computer-readable medium comprising programming instructions that, when executed, by the processor will cause the processor to:
generate a spatial domain speed profile for a path that is represented as a sequence of poses of a vehicle between a first point and a second point, wherein the generating uses a longitudinal problem and excludes a derate interval that corresponds to a portion of the path within which a speed of the vehicle cannot exceed a threshold,
generate, using the spatial domain speed profile and the derate interval, a derate profile for the path by combining the derate interval with the spatial domain speed profile and determining a speed as a weighted average at each point along the path,
transform, using the derate profile, the derate interval to a temporal derate interval comprising time steps at which the speed of the vehicle cannot exceed the threshold while traversing the path,
generate, using the temporal derate interval as an input to the longitudinal problem, a speed profile for the path, and
generate, based on the speed profile and the path, a trajectory of the vehicle for navigating between the first point and the second point.

8. The system of claim 7, wherein the instructions that, when executed, will cause the processor to generate the spatial domain speed profile comprise programming instructions that will cause the processor to:
generate, using the longitudinal problem and excluding the derate interval, a temporal speed profile; and
generate the spatial domain speed profile by transforming the temporal speed profile to a spatial domain.

9. The system of claim 7, wherein the instructions that when executed will cause the processor to generate the derate profile for the path comprise programming instructions that will cause the processor to combine the derate interval with the spatial domain speed profile and determining a minimum speed at each point along the path.

10. The system of claim 7, further comprising programming instructions that when executed will cause the processor to determine the derate interval based on at least one of the following: occlusions along the path, map information corresponding to the path, or perception information corresponding to the path.

11. The system of claim 10, wherein the derate interval is determined in a spatial domain relative to the path.

12. The system of claim 7, wherein the derate interval comprises an identification of the portion of the path and the threshold based on a rule set or a machine learning model.

13. A computer program product comprising programming instructions that are configured to cause a processor to:
generate a spatial domain speed profile for a path that is represented as a sequence of poses of a vehicle between a first point and a second point, wherein the generating uses a longitudinal problem and excludes a derate interval that corresponds to a portion of the path within which a speed of the vehicle cannot exceed a threshold;
generate, using the spatial domain speed profile and the derate interval, a derate profile for the path by combining the derate interval with the spatial domain speed profile and determining a minimum speed at each point along the path;
transform, using the derate profile, the derate interval to a temporal derate interval comprising time steps at which the speed of the vehicle cannot exceed the threshold while traversing the path;
generate, using the temporal derate interval as an input to the longitudinal problem, a speed profile for the path; and
generate, based on the speed profile and the path, a trajectory of the vehicle for navigating between the first point and the second point.

14. The computer program product of claim 13, wherein the programming instructions that are configured to cause the processor to generate the spatial domain speed profile comprise programming instructions that will cause the processor to:
  generate, using the longitudinal problem and excluding the derate interval, a temporal speed profile; and
  generate the spatial domain speed profile by transforming the temporal speed profile to a spatial domain.

15. The computer program product of claim 13, wherein the programming instructions that are configured to cause the processor to generate the derate profile for the path comprise programming instructions that will cause the processor to combine the derate interval with the spatial domain speed profile and determining a minimum speed at each point along the path.

16. The computer program product of claim 13, further comprising programming instructions that are configured to cause the processor to determine the derate interval based on at least one of the following: occlusions along the path, map information corresponding to the path, or perception information corresponding to the path.

17. The computer program product of claim 16, wherein the derate interval is determined in a spatial domain relative to the path.

* * * * *